US008804865B2

(12) United States Patent
Elenes et al.

(10) Patent No.: US 8,804,865 B2
(45) Date of Patent: Aug. 12, 2014

(54) DELAY ADJUSTMENT USING SAMPLE RATE CONVERTERS

(75) Inventors: Javier Elenes, Austin, TX (US); Dana Taipale, Austin, TX (US); Dave Anderton, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 518 days.

(21) Appl. No.: 13/172,260

(22) Filed: Jun. 29, 2011

(65) Prior Publication Data

US 2013/0003894 A1    Jan. 3, 2013

(51) Int. Cl.
*H04B 7/02*    (2006.01)
*H04B 1/10*    (2006.01)
*H04L 1/00*    (2006.01)
*H04H 60/12*   (2008.01)
*H04L 5/00*    (2006.01)
*H04L 27/26*   (2006.01)

(52) U.S. Cl.
CPC .............. *H04H 60/12* (2013.01); *H04L 5/0007* (2013.01); *H04L 27/2662* (2013.01)
USPC ......................................... 375/267; 375/346

(58) Field of Classification Search
CPC ....... H04H 20/12; H04H 20/67; H04H 40/18; H04H 60/12
USPC .................. 375/260, 267, 340, 346
See application file for complete search history.

(56) References Cited

U.S. PATENT DOCUMENTS

| 5,873,062 | A | 2/1999 | Hansen et al. |
|---|---|---|---|
| 6,144,705 | A | 11/2000 | Papadopoulos et al. |
| 6,671,340 | B1 | 12/2003 | Kroeger et al. |
| 6,947,551 | B2 | 9/2005 | Givens |
| 7,272,363 | B1 | 9/2007 | Fluker |
| 7,400,954 | B2 | 7/2008 | Sumcad et al. |
| 7,944,998 | B2 | 5/2011 | Shridhar et al. |
| 7,953,183 | B2 | 5/2011 | Shridhar et al. |
| 8,040,989 | B2 | 10/2011 | Nekhamkin et al. |
| 8,073,497 | B2 | 12/2011 | Fratila |
| 2001/0003089 | A1 | 6/2001 | Kroeger et al. |
| 2002/0115418 | A1 | 8/2002 | Wildhagen |
| 2004/0043730 | A1* | 3/2004 | Schill et al. .................. 455/130 |
| 2005/0113049 | A1* | 5/2005 | Takayama et al. ......... 455/150.1 |
| 2006/0083380 | A1 | 4/2006 | Mino et al. |
| 2006/0227814 | A1 | 10/2006 | Iannuzzelli et al. |
| 2007/0004335 | A1 | 1/2007 | DeMoor et al. |
| 2007/0291876 | A1 | 12/2007 | Shridhar et al. |
| 2007/0293167 | A1 | 12/2007 | Shridhar et al. |
| 2009/0258640 | A1* | 10/2009 | Persson et al. ................ 455/425 |
| 2010/0027719 | A1 | 2/2010 | Pahuja |
| 2010/0100923 | A1 | 4/2010 | Toiyama |
| 2012/0028567 | A1 | 2/2012 | Marko |
| 2012/0189070 | A1 | 7/2012 | Kroeger |

* cited by examiner

*Primary Examiner* — David B. Lugo
(74) *Attorney, Agent, or Firm* — Meyertons, Hood, Kivlin, Kowert & Goetzel, P.C.; Erik A. Heter

(57) ABSTRACT

A method and apparatus for adjusting the delay of a first data stream relative to a second data stream is disclosed. An apparatus receives first and second data streams having identical content. A timing difference between the first and second data streams is estimated. At least the leading one of the data streams is applied to a sample rate converter. The sample rate converter is configured to receive a data stream at an input sampling rate and to output the data stream at an output sampling rate. Based on the estimated timing difference, delay is applied to the leading one of the data streams by changing the sampling rate of the sampling rate converter. The output sampling rate of the sampling rate converter may be adjusted until both data streams are aligned in time.

16 Claims, 10 Drawing Sheets

DELAY ADJUSTMENT USING SAMPLE RATE CONVERTERS

RELATED APPLICATIONS

The present application is related to the following applications filed concurrently herewith: U.S. application Ser. No. 13/172,208 entitled "Delaying Analog Sourced Audio in a Radio Simulcast"; U.S. application Ser. No. 13/172,260 entitled "Delay Adjustment using Sample Rate Converters"; and U.S. application Ser. No. 13/172,290 entitled "Delay Estimation based on Reduced Data Sets".

BACKGROUND

1. Field of the Invention

This invention relates to radio receivers, and more particularly, radio receivers capable of simultaneously receiving content broadcast on analog and digital broadcast channels.

2. Description of the Related Art

In recent years, digital radio has emerged as an alternative to analog-only radio broadcasting. For example, the introduction of what was originally known as hybrid digital radio (hereinafter "HD radio") enabled radio programming to be broadcast in both analog and digital formats. Furthermore, the programming may be simultaneously broadcast (sometimes referred to as "simulcast") in both analog and digital formats. Radio receivers may be designed to receive both of these formats, and may utilize the analog data or the digital data based on various factors.

In one example of an HD radio simulcast, an audio program may be transmitted in analog format on an FM (frequency modulated) carrier signal. The audio program may be simultaneously broadcast in digital format in sidebands occurring on either side of the FM signal. The digital format may include a number of subcarriers modulated using quadrature phase shift keying (QPSK) and multiplexed using orthogonal frequency division multiplexing (OFDM). Often times, the HD radio receiver will first acquire the FM signal and subsequently, the digital signal. Audio may begin playing on the receiver using data extracted from the FM signal. A blend operation may then be performed to blend audio extracted from the FM signal with audio extracted from the digital signal. At the end of the blend process, the audio playback may be entirely based on the digital signal, unless the digital signal fades. Should the digital signal fade, then the analog signal may be used as a backup mechanism for continuing to receive the programming. Should the digital signal be re-acquired, the blend operation may be repeated.

In the above example, the delay between the analog and digital signals may be inherent due to the multi-second processing delay required for transmission of OFDM signals. Accordingly, broadcasters of HD radio content may delay to the transmission of the analog FM signal by a static amount of time in order to align the analog and digital signals at the receiver.

SUMMARY OF THE DISCLOSURE

A method and apparatus for performing dynamic time alignment of program content extracted from analog and digital radio signals of a simulcast is disclosed. In one embodiment, a delay estimation unit of a radio receiver is configured to dynamically determine an amount of delay between analog-transmitted and digital-transmitted portions of a received simulcast radio program. The received delay may be determined based on respective data streams corresponding to the analog and digital portions. An internal delay may be applied to at least one of the data streams to bring it into time alignment with the other data stream. Upon the data streams becoming substantially aligned in time, a blend operation transitioning to audio sourced from the analog portion to audio sourced from the digital portion may be performed. If the data streams are substantially aligned in time, the blend operation may be performed without generating audible audio artifacts.

The delay may be determined by a delay estimation unit configured to filter and decimate the data streams to produce decimated data streams having a reduced amount of data per unit time. Correlation of the decimated data streams may be performed to determine which of the data streams is leading. Delay may be applied to the leading data stream in various ways, including adjusting the output sampling rate of a sample rate converter or varying a pointer separation of a first-in, first-out memory (FIFO).

Upon receiving a simulcast radio signal, a receiver may initially provide low-latency audio from the analog source. In the case where the analog source is leading the digital source, delay may be applied incrementally to the analog data stream to align it with the digital data stream at a rate that does not generate audible audio artifacts. Upon the data streams becoming sufficiently aligned in time, the blend operation may be performed.

BRIEF DESCRIPTION OF THE DRAWINGS

Other aspects of the disclosure will become apparent upon reading the following detailed description and upon reference to the accompanying drawings in which.

Figure 1:
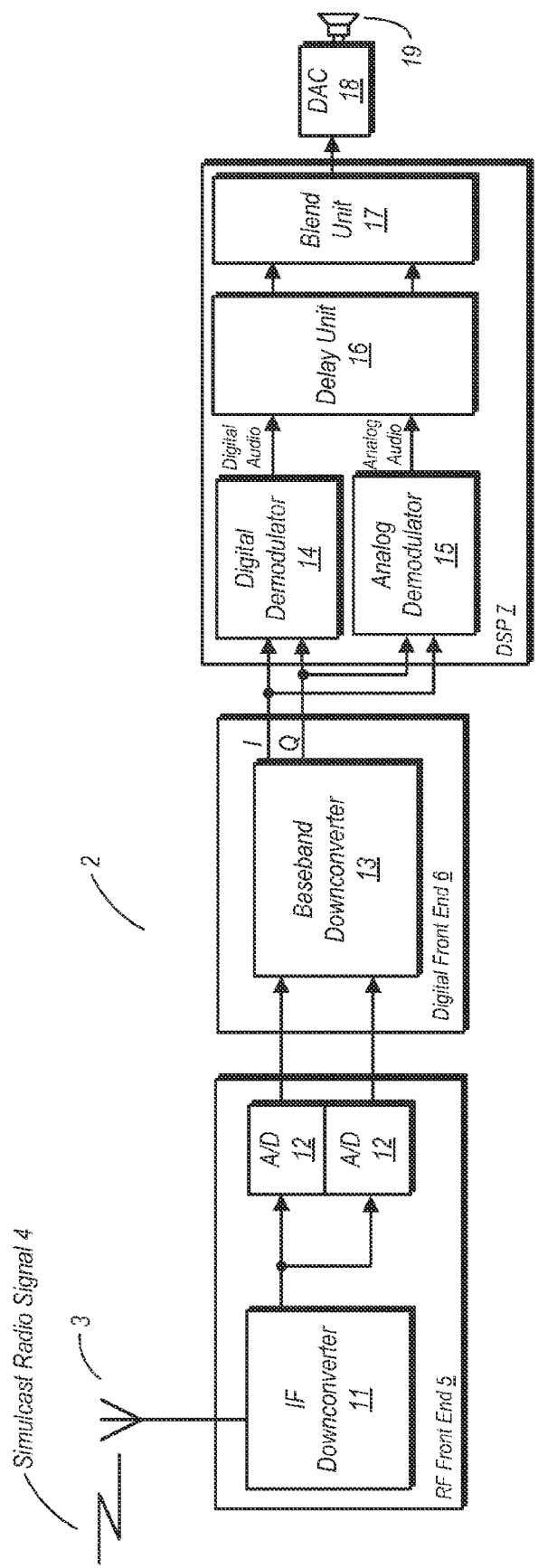
FIG. 1 is a block diagram illustrating one embodiment of a radio receiver configured to receive programming simulcast on analog and digital radio channels.

While the concepts described herein are susceptible to various modifications and alternative forms, specific embodiments thereof are shown by way of example in the drawings and in the accompanying detailed description. It should be understood, however, that the drawings and description are not intended to limit the disclosure to the particular forms disclosed, but, on the contrary, are intended to cover all modifications, equivalents, and alternatives falling within the spirit and scope of the disclosed embodiments and the appended claims.

DETAILED DESCRIPTION

The present disclosure is directed to various method and apparatus embodiments for dynamically adjusting the delay between radio content extracted from an analog radio signal and a digital radio signal from a radio simulcast. As used herein, the term "simulcast" may refer to a radio program that is broadcast from a transmitter on both an analog radio signal (e.g., such as a frequency modulated, or FM signal) and a digital radio signal (e.g., the digital portion of an HD radio signal), such that two formats of the same program content are available to a corresponding HD receiver. It should be noted that the term "simulcast" is not meant to connote that the program content transmitted on the analog radio signal is necessarily broadcast in precise synchronization with that transmitted on the digital radio signal (something that may not be achievable under real-world conditions). Instead, there may be some inherent delay existing between the program content transmitted on the analog radio signal and that which is transmitted on the digital radio signal. However, despite the best intentions and efforts of the broadcaster, the program material carried on the analog and digital channels may still exhibit some relative delay. The residual delay may result from a variety of root causes, such as: systemic errors in time alignment between the analog and digital signals, differences in signal processing applied to the analog and digital paths (e.g., companding, pre-emphasis, equalization, etc.), differences in propagation delay between studio and transmitter, etc. The present disclosure is thus directed to performing a blend operation from the analog source to the digital source to be performed without producing audio artifacts that are discernible to the listener.

In one embodiment, digital radio signals, such as those broadcast as part of an HD radio signal, may transmit information on subcarriers in a signal that utilizes OFDM. Before the program content transmitted on a digital radio signal can be converted into audio, the information contained in the subcarriers may need to be re-assembled through a time de-interleaving process. The de-interleaving process may create a delay in the content broadcast on the digital radio signal relative to the same content as broadcast on a corresponding analog radio signal. This can result an in inherent delay between the program content carried on the analog radio signal and that carried on the digital radio signal. When performing the blend operation (i.e. the transition from analog-sourced audio to digital-source audio), this delay may result in audio artifacts (e.g., echoes) that can reduce the quality of the output audio. Some broadcasters of simulcast radio programs may introduce a static delay into the program content transmitted on the analog radio signal in order to compensate for the inherent receiver delay. In other words, HD broadcasters may introduce a transmission delay into the analog portion of the signal to compensate for delays in processing the digital portion of the signal on the receiver side. This technique has not yielded ideal results in actual practice, as such static transmission delays in many cases do not result in a simulcast that can be blended from analog-sourced audio to digitally-sourced audio without noticeable artifacts. In contrast, certain embodiments disclosed herein may detect the transmission delay and adjust the time alignment between the data streams extracted from the analog and digital radio signals until they are sufficiently aligned in time such that a blend operation may be performed without causing audible audio artifacts.

In one embodiment, the detection and adjustment of the delay between the data streams as initially received may be performed by a delay estimation unit. The delay unit may include circuitry to detect which of the two data streams is leading, and further determine the amount of delay between them. The delay may be determined based on a number of samples that is a small fraction of the overall number of samples in each data stream. Based on the detected delay, the delay estimation unit may generate one or more control signals that cause the delay to be adjusted, and more particularly, to be reduced. The adjustment of the delay may be performed by various methods, such as varying the sampling rate of one or more sample rate converters, or adjusting a pointer separation in a first-in first-out memory (FIFO). The delay may also be adjusted continuously or incrementally at a rate sufficiently slow so as to avoid audio artifacts if the analog data stream leads the digital data stream. The delay estimation unit may cease adjustments when the data streams are sufficiently aligned, and provide a signal to a blend unit indicating that a blend operation may commence. Various method and apparatus embodiments that perform these functions will now be described in further detail.

Turning now to FIG. 1, a block diagram illustrating one embodiment of a radio receiver configured to receive programming simulcast on analog and digital radio channels is shown. Radio receiver 2 in the embodiment shown is a heterodyne receiver that performs a conversion of received radio frequency (RF) signals to a low intermediate frequency (IF) signal, followed by a second conversion to a baseband frequency. It is noted however that embodiments that operate on the principle of direct conversion from RF to baseband (sometimes referred to as zero-IF receivers) are possible and contemplated for use with the various method and apparatus embodiments described herein. Furthermore, while the embodiment shown here is functionally partitioned into RF front end 5, digital front end 6, and digital signal processor (DSP) 7, with various subunits in each, other partitions, both through hardware and software, are possible and contemplated.

In the embodiment shown, a simulcast radio signal 4 may be initially detected via antenna 3. As will be discussed with reference to FIG. 2, one embodiment of a simulcast radio signal may include an FM carrier signal having the RF center frequency (the analog radio signal), with upper and lower sidebands (the digital radio signal). The information, or program content of the simulcast, is modulated onto the FM carrier using analog modulation techniques and onto the sidebands using digital modulation techniques. Simulcast radio signal 4 may then be received by IF downconverter 11, which may include a low-noise amplifier and a mixer to convert the RF signal to an IF signal. The IF signal may be output in analog form from IF downconverter 11. The IF signal may be then received by analog-to-digital (A/D) converter 12 to produce a low-IF complex signal. In another embodiment, the analog and digital transmissions may occur on different frequencies in which case two independent IF converters might be employed to extract the analog and digital data streams.

The complex output of A/D converter 12 may be forwarded to baseband downconverter 13. A second mixer to convert IF signals to baseband signals may be included in baseband downconverter 13. The baseband downconverter 13 in the embodiment shown is configured to output digital versions of the respective I and Q components, as modulated at the baseband frequency.

The I and Q components of the baseband signal may be received by digital demodulator 14 and analog demodulator 15. Digital demodulator 14 may perform demodulation of the baseband signal to extract the program content as transmitted on the digital radio signal. In embodiments where the program content transmitted on the digital radio signal is multiplexed using OFDM, digital demodulator 14 may perform time de-interleaving of the data to re-assemble the original data sequence. The output of digital demodulator 14 is a first stream of digital data, referred to hereafter as the first digital data stream. Analog demodulator 15 may perform demodulation of the baseband signal to extract the program content as transmitted on the analog radio signal. The output of analog demodulator 15 is a second stream of digital data, referred to hereafter as the second digital data stream. Accordingly, the reference to "analog" or "digital" with regard to a particular data stream in this disclosure connotes the radio signal from which it was extracted, as both data streams are in a digital format at this point.

The digital and analog data streams are received from their respective demodulators by delay unit 16. Delay unit 16 in the embodiment shown is configured to dynamically determine the time alignment between the digital and analog data streams (i.e. the delay of one data stream with respect to the other). The determination made by delay unit 16 may include the amount of reception delay between the two data streams. The reception delay may be defined as that delay which is inherent between the two data streams based on the reception of their corresponding radio signals. Delay unit 16 may also determine which of the two data streams is leading (or lagging) in time with respect to the other. Based on this information, delay unit 16 may adjust an internal delay between the digital and analog data streams to align them in time. This may be accomplished by applying a delay to the data stream that is leading in time, reducing a delay to the data stream that is lagging in time, or both.

The digital and analog data streams may be received from delay unit 16 by blend unit 17. When the two data streams are sufficiently aligned in time, blend unit 17 may perform a blend operation that transitions the audio output from being analog-sourced (i.e. generated from the analog data stream) to being digitally-sourced (i.e. generated from the digital data stream). The blend operation may be performed in such a manner that it does not produce and audio artifacts detectable by a listener of the simulcast radio program. The blend operation will be described in further detail with reference to FIG. 3.

Blend unit 17 is configured to provide an output data stream. The output data stream may be provided as digital data. During the blend operation, the output data stream may include contributions from the analog data stream and the digital data stream received by blend unit 17. When not performing the blend operation, the output data stream may be based primarily on either the analog data stream or the digital data stream. The output data stream may be received by digital-to-analog converter (DAC) 18, which converts the output data stream into an analog audio signal. The analog audio signal may be received by one or more speakers 19, which then provides the program content as audio.

Figure 2:
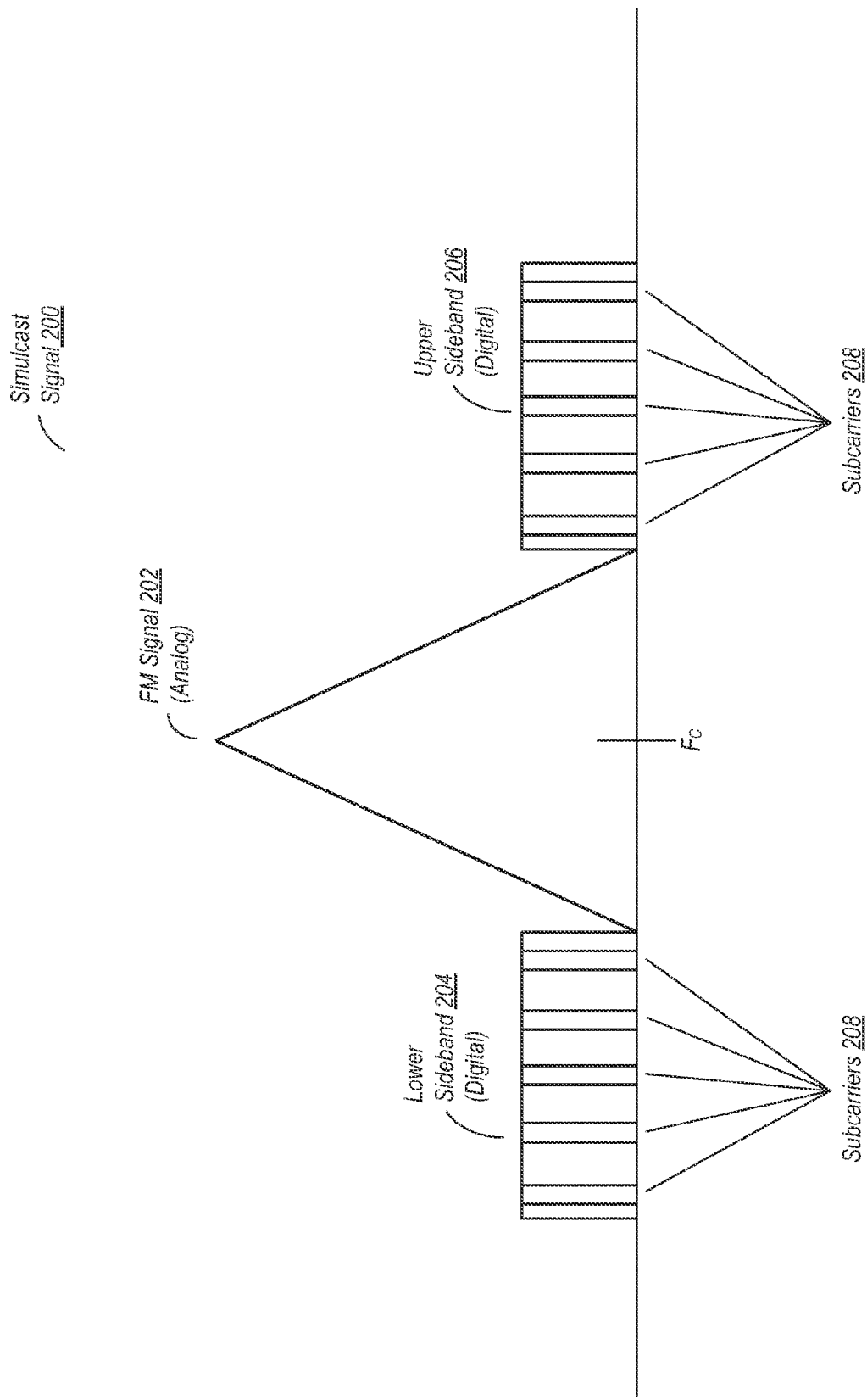
FIG. 2 is a spectral diagram illustrating the relationship of analog and digital signals received in a simulcast by an embodiment of the radio receiver of FIG. 1.

FIG. 2 a spectral diagram illustrating the relationship of analog and digital signals transmitted in a radio simulcast. In the embodiment shown, simulcast signal 200 includes FM signal 202 (the "analog radio signal"). FM signal 202 is broadcast at a carrier frequency F. The peak energy of FM signal 202 (as well as simulcast signal 200) occurs at the carrier frequency in this example. The spectral width of the FM signal 202 in this example may be approximately 200 kHz.

In addition to the analog radio signal, simulcast signal 200 also includes two sidebands, lower sideband 204 and upper sideband 206 (collectively, "the digital radio signal"). The spectral width of each of these sidebands may be approximately 100 kHz in this example. With respect to power, the ratio of FM signal 202 to the sidebands may be about 20 decibels (dB) in this example, although this ratio may vary among different embodiments.

Each sideband in the embodiment shown may include a number of subcarriers 208. During the transmission process, the information to be carried in the digital radio signal may be time interleaved into multiple data streams. These multiple data streams may be modulated using various techniques, such as quadrature phase shift keying (QSPK). Furthermore, each of the multiple data streams may be modulated at a different frequency with respect to the others. Accordingly, lower sideband 204 and upper sideband 208 may be transmitted as OFDM signals each having multiple subcarriers 208. Upon reception of the digital signal by a radio receiver, the information contained in each subcarrier may be interleaved to reconstruct the original data stream subsequent to downconversion and demodulation.

As the depicted radio signal is a simulcast signal, the program content carried on FM signal 202 is the same as that transmitted in the combination of lower sideband 204 and upper sideband 206. Since the program content as transmitted in the sidebands is interleaved in time prior to modulation and upconversion to respective subcarrier frequencies, the program content transmitted on digital radio signal may lag in time with respect to the corresponding program content that is transmitted on the analog radio signal. Left uncorrected, this time lag can cause significant audio artifacts that are detectable by a listener during a blend operation performed by a corresponding receiver. In some cases, transmitters of simulcasts may delay the transmission of the program on the analog radio signal to attempt to compensate for this time lag. However, delaying transmission of the program on the analog radio signal may not be sufficient to prevent audio artifacts from being heard by a listener when a receiver performs a blend operation.

Figure 3:
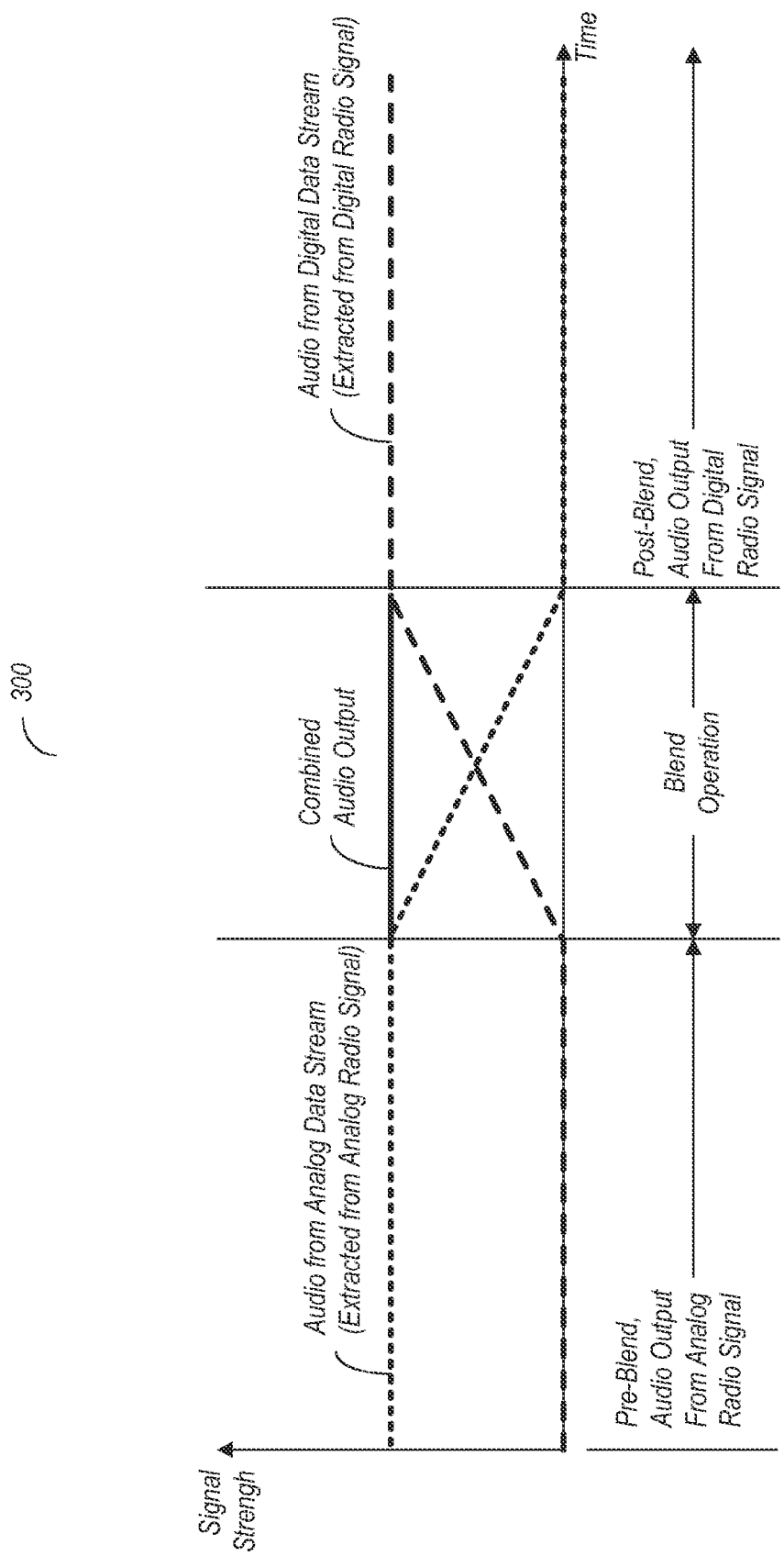
FIG. 3 is a diagram illustrating one embodiment of a blend operation.

An example of a blend operation is depicted in FIG. 3. Blend unit 17 as shown in FIG. 1 is one embodiment of hardware that may perform blend operation 300 as shown in FIG. 3. Embodiments are also possible and contemplated wherein blend operation 300 is performed by software executing on a processor. In one embodiment, the blend operation may employ linear transitions of volume between the two streams. In another embodiment, the blend operation may employ logarithmic transitions of volume. Other blend profiles are contemplated.

In the example shown, the initial audio output provided upon reception of a simulcast radio signal is provided primarily from the analog data stream ("analog-sourced audio"). Thus, most (if not all) of the signal strength of the output audio signal is based on program content extracted from the analog radio signal during the pre-blend phase.

During the blend operation, the contribution of the analog data stream to the signal strength of the output audio signal is gradually reduced. Correspondingly, the contribution of the digital data stream to the signal strength of the output audio signal ("digitally-sourced audio") is gradually increased. The gradual signal strength increase of the digitally-sourced audio with the corresponding reduction of signal strength of the analog-sourced audio may be performed in such a manner that the signal strength of the combined audio output remains relatively constant.

The blend operation may continue until the signal strength contribution of the analog-sourced audio is virtually (if not completely) eliminated. The signal strength contribution of the digitally-sourced audio may be correspondingly increased until it matches the signal strength of the analog-sourced audio as provided during the pre-blend phase. Once this point has been reached, the blend operation may be considered complete. During the post-blend phase, the audio is primarily (if not completely) digitally-sourced.

If the digital signal fades subsequent to performing the blend operation, audio output may again become analog-sourced. Embodiments of a radio receiver are possible and contemplated wherein a reverse blend operation may be performed if the bit error rate (BER) of the received digital radio signal falls below a certain threshold. Should the digital signal be subsequently re-acquired at a BER exceeding the threshold, the blend operation shown herein may be performed again to transition from analog-sourced audio to digitally-sourced audio.

Figure 4:
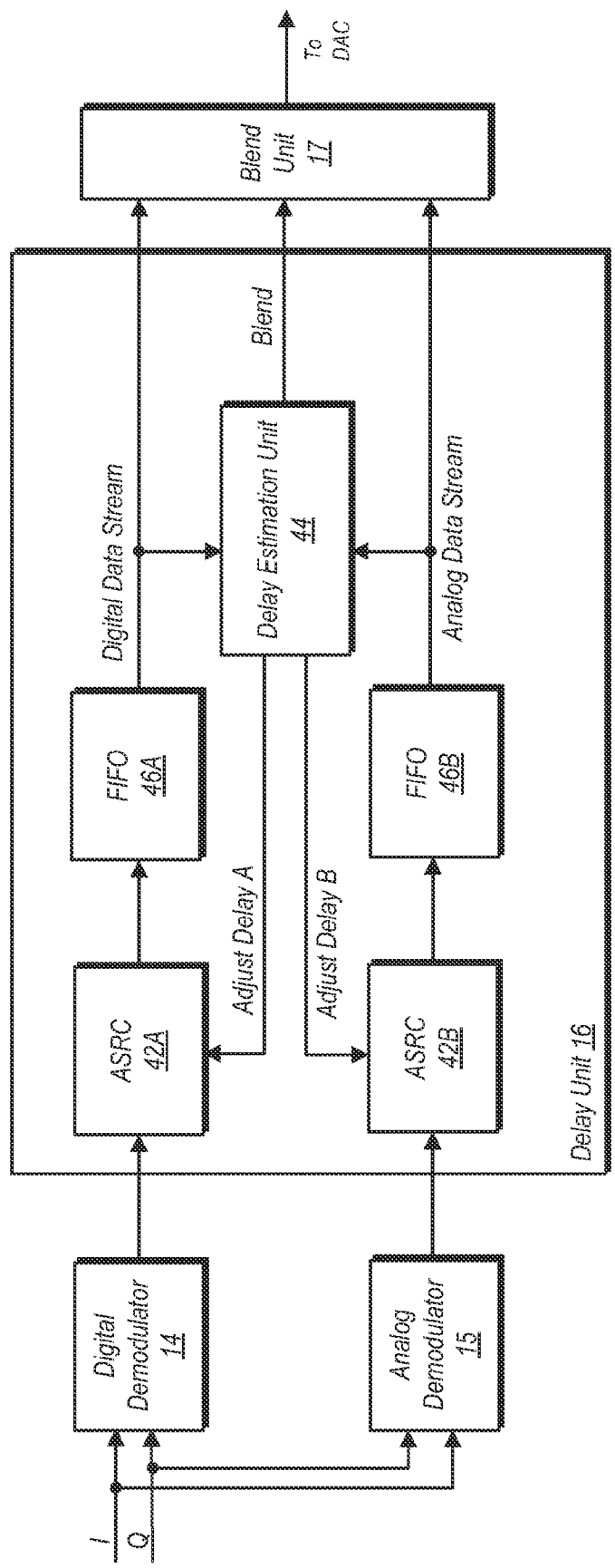
FIG. 4 is a block diagram illustrating one embodiment of a dynamic time alignment unit for aligning simulcast digital and analog programming.

FIG. 4 is a block diagram illustrating one embodiment of a delay unit. In the embodiment shown, delay unit 16 includes an asynchronous sample rate converter (ASRC) 42A coupled to receive the digital data stream from digital demodulator 14. Delay unit 16 also includes ASRC 42B, which is coupled to receive the analog data stream from analog demodulator 15. Each of ASRC 42A and 42B may receive their corresponding data streams at respective input sampling rates. The corresponding data streams may be output from each of ASRC 42A and 42B at respective output sampling rates, which may be different from the corresponding input sampling rates. For example, ASRC 42A may receive the digital data stream at an input sampling rate of 44 kHz, and may provide the digital data stream at an output sampling rate of 43.5 kHz. The respective sampling rates at which each of ASRC 42A and 42B provide their respective output data streams may be adjustable. The ability to vary the respective sampling rates of ASRC 42A and 42B may be used to adjust the time alignment between the digital and analog data streams, as will be discussed in additional detail below.

The output of ASRC 42A may be received by a FIFO 46A, while the output of ASRC 42B may be received by FIFO 46B. Each of FIFO 46A and 46B may provide temporary storage of received samples before outputting them to blend unit 17. The output rate at which each of FIFOs 46A and 46B provide samples may match a respective rate at which samples may be processed by blend unit 17.

In the embodiment shown, delay unit 16 further includes a delay estimation unit 44, which is coupled to receive each of the digital and analog data streams. More particularly, the digital and analog data streams are received by delay estimation unit 44 from FIFO 46A and FIFO 46B respectively, in this embodiment. Delay estimation unit 44 may determine a delay, or timing difference, between the digital and analog data streams. In addition, delay estimation unit 44 may determine which of the two data streams is leading the other. Based on the determination of which data stream is leading and the amount of delay between the signals, delay estimation unit 44 may generate delay adjustment signals. A first delay adjustment signal (or set of delay adjustment signals), Adjust Delay A, may be provided to ASRC 42A. A second delay adjustment signal (or set of delay adjustment signals), Adjust Delay B, may be provided to ASRC 42B. The delay adjustment signals received by a respective one of ASRC's 42A and 42B may cause it to change its output sampling rate.

Adjustment of the output sampling rates of ASRC 42A and ASRC 42B may change the delay of their respective data stream and thus alter the timing relationship therebetween. Reducing the output sampling rate of a given ASRC may add delay into the path for its respective data stream. Increasing the output sampling rate of a given ASRC may reduce delay in the path for its respective data stream. Accordingly, delay estimation unit 44 may generate delay adjustment signals to change the delay in at least one path, if not both, to change the timing relationship between the analog and digital data streams. Moreover, the changing of the delay in one or both paths may be performed in order to more closely align the analog data stream with the digital data stream. When the analog data stream and the digital data stream are sufficiently (if not exactly) aligned in time, delay estimation unit 44 reverts the sample rate(s) to their nominal values and may assert a blend signal (Blend). Responsive to receiving the blend signal, blend unit 17 may initiate the blend operation to transition from analog-sourced audio to digitally-sourced audio.

Figure 5:
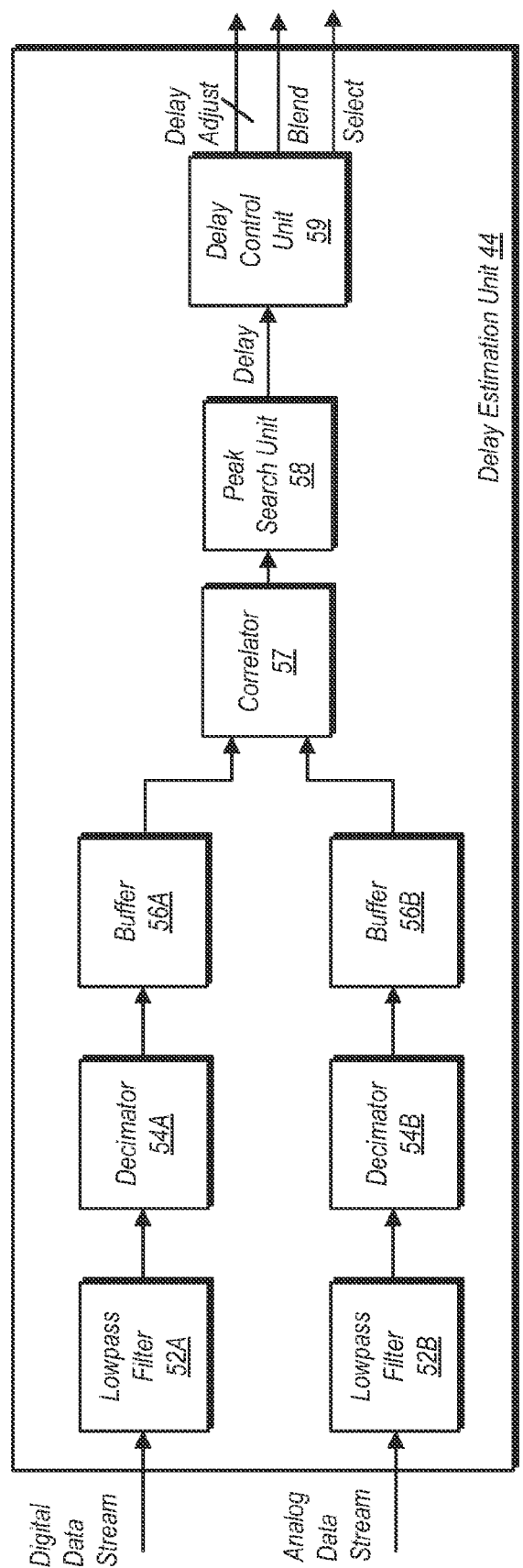
FIG. 5 is a block diagram of one embodiment of a dynamic delay estimator.

FIG. 5 is a block diagram illustrating one embodiment of delay estimation unit 44, which may be used to dynamically determine the relative delay between the analog and digital data streams. In the embodiment shown, delay estimation unit 44 includes a first low pass filter 52A coupled to receive the digital data stream. A second low pass filter 52B is coupled to receive the analog data stream. Low pass filters 52A and 52B are implemented as digital filters in this embodiment. It is noted that, in lieu of low pass filters, bandpass filters may be utilized. In either case, filtering may be performed to allow a lower portion of the audio spectrum to pass, while eliminating the upper portion of the audio spectrum in order to reduce the overall amount of data used in determining the relative delay between the analog and digital data streams.

In one embodiment, low pass filters 52A and 52B may have a cutoff frequency in the range of 40-60 Hz (e.g., 50 Hz). Low pass filtering (or bandpass filtering at a low portion of the audio spectrum) may reduce the amount of data to be processed in the delay estimation operation relative to processing the full 20 kHz of the audio spectrum. More particularly, by utilizing only a small, lower portion of the audio spectrum, the sampling rate may be reduced since the Nyquist frequency is lower. Thus, using the 50 Hz example, the Nyquist frequency (and thus the sampling rate) is 100 Hz, whereas the minimum sampling rate required for the 20 kHz audio spectrum is 40 kHz.

Low pass filter 52A may output a first filtered data stream to decimator 54A. Similarly, low pass filter 52B may output a second filtered data stream to decimator 54B. Decimators 54A and 54B may further reduce the amount of data to be processed in the delay estimation operation by eliminating samples. In the embodiment shown, decimators 54A and 54B may keep one of every N samples, wherein N is an integer greater than one (in one embodiment, N=200). Accordingly, decimators 54A and 54B may provide decimated data streams by outputting one of every N received samples. In general, the value of N may be computed by the formula $N < f_s/(2f)$, where $f_s$ is the sampling frequency (before decimation) and f is the corner frequency of the filter.

Data from the decimated data streams may be received by buffers 56A and 56B (corresponding to decimators 54A and 54B, respectively). In one embodiment, each of buffers 56A and 56B may be implemented as a FIFO. The reduction of the amount of data to be utilized in the delay estimation process, through low pass filtering and decimation, may in turn enable buffers 56A and 56B to be relatively small in relation to the storage space that would be required for a higher number of samples commensurate with processing a larger portion of the audio spectrum.

Each of buffers 56A and 56B is coupled to provide data from its respectively received decimated data stream to correlator 57. Correlator 57 may perform a digital correlation operation on the two streams of decimated data, the results of which may indicate the relative time alignment between the analog and digital data streams at a given point in time. More particularly, the correlation operation performed by correlator 57 may include multiplying together decimated data from each stream. The result of the multiplication may appear as noise, with a large peak when the data streams are aligned in time. Correlator 57 may also determine which of the analog and digital data streams is leading the other.

The output of correlator 57 may be a signed product received by peak search unit 58. In the embodiment shown, peak search unit 58 may analyze correlation results over time to search for peaks that indicate that the digital data streams are aligned in time. In some embodiments, a squaring function may square the product output by correlator 57 in order to further emphasize the peaks. Based on the received data, peak search unit 58 may output an indication of the relative delay between the analog data stream and the digital data stream. The indication of relative delay may include an indication of which one of the two data streams is leading the other.

The delay indication output by peak search unit may be received by delay control unit 59. Based on the received delay indication, delay control unit 59 may generate various control signals. In the embodiment shown, delay control unit 59 may generate delay adjustment signals (delay adjust) that may be provided to functional units in the path of one or both data streams to adjust their delay relative to each other. In some embodiments (as will be discussed below), delay control unit 59 may assert or de-assert a select signal based on the indicated delay in order to route the data streams into appropriate signal paths. Delay control unit 59 in the embodiment shown may also keep track of the delays applied and assert the blend signal upon receiving an indication that the relative delay between the analog and digital data streams is zero or is sufficiently small that a blend operation can be performed without generating audio artifacts.

Figure 6:
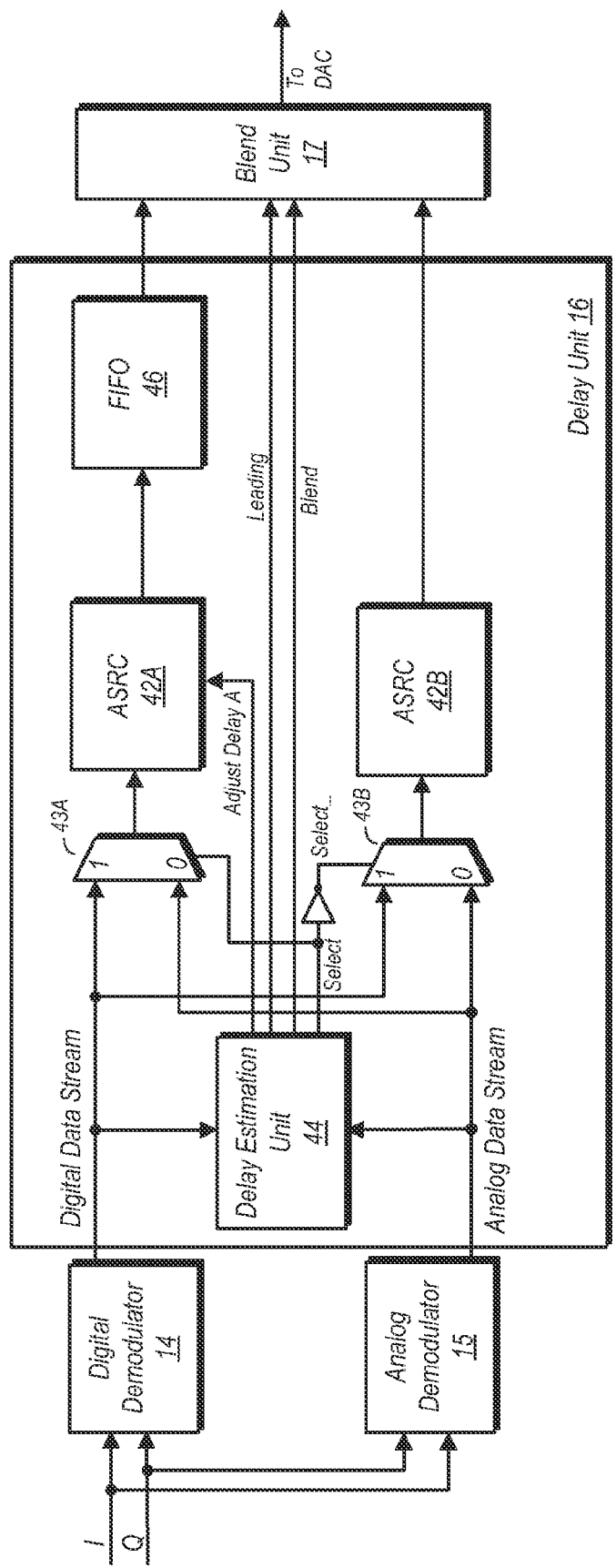
FIG. 6 is a block diagram of another embodiment of a dynamic time alignment unit.

FIG. 6 is a block diagram illustrating another embodiment of a delay estimation unit. In this particular embodiment, delay unit 16 implements only a single FIFO 46 (as opposed to having one in each data path). Furthermore, delay unit 16 in this embodiment implements two selection circuits 43A and 43B. The digital data stream may be provided to the '1' input of each of selection circuits 43A and 43B. The analog data stream may be provided to the '0' input of each of selection circuit 43A and 43B.

Delay estimation unit 44 in this embodiment may receive the digital and analog data streams directly from digital demodulator 14 and analog demodulator 15, respectively. Based on the determination of which data stream is leading in time, delay estimator 44 may assert or de-assert the selection signal (Select), causing its complement (Select_) to be driven to the opposite state. If the digital data stream is leading in this embodiment, delay estimator 44 may output the select signal as a logic 1, causing the digital data stream to be selected by selection circuit 43A and the analog data stream to be selected by selection circuit 43B. If the analog data stream is leading, the selection signal may be output as a logic 0, thereby causing selection circuit 43A to select the analog data stream and selection circuit 43B to select the digital data stream.

The leading data stream output from selection circuit 43A may be provided to ASRC 42A. Delay estimator 44 may provide adjustment signals (Adjust Delay A) to ASRC 42A in order to increase the delay in the path of the leading data stream until it is sufficiently aligned with the lagging data stream. The delay may be increased by reducing the sampling rate of ASRC 42A. The output of ASRC 42 may then be provided to FIFO 46. In turn, FIFO 46 may provide data from the leading data stream to blend unit 17 at its output sampling rate.

The lagging data stream output from selection circuit 43B may be provided to ASRC 42B. The output sampling rate of ASRC 42B may match that of blend unit 17. Accordingly, a FIFO is not utilized in this embodiment between the output of ASRC 42B and the corresponding input of blend unit 17. Delay estimation unit 44 in the embodiment shown is further coupled to provide the blend signal to blend unit 17 responsive to determining that the analog and digital data streams are sufficiently aligned in time.

Delay estimation unit 44 in this embodiment may also provide a signal or signals (Leading) indicating which of the analog and digital data streams is leading the other. Based on the state of the leading indication, blend unit 17 may determine which of the paths is providing the analog data stream and which is providing the digital data stream. Blend unit 17 may then utilize the data received from the path indicated as providing analog data stream to produce audio until the blend operation begins.

Figure 7:
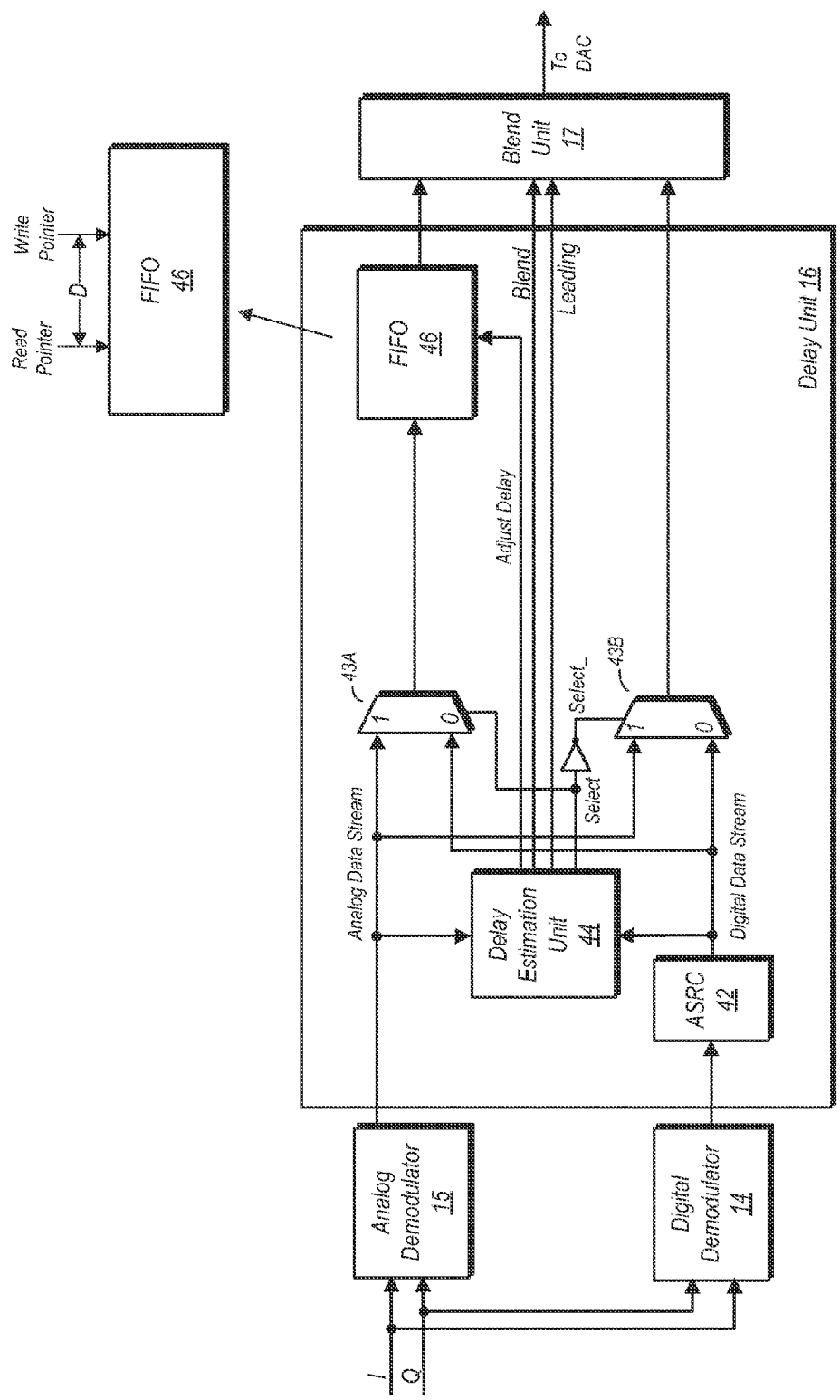
FIG. 7 is a block diagram of a third embodiment of a dynamic time alignment unit.

Another embodiment of a delay unit 16 is illustrated in FIG. 7. In this particular embodiment, delay unit 16 utilizes a single ASRC 42 and a single FIFO 46. In this embodiment, the output sampling rate of analog demodulator 15 matches the same of blend unit 15, while the output sampling rate of digital demodulator 14 does not. It is noted however that embodiments are possible and contemplated wherein the output sampling rate of digital demodulator 14 matches the output sampling rate of blend unit 17. Similarly, embodiments wherein the output sampling rate of analog demodulator 15 does not match the output sampling rate of blend unit 17 are also possible and contemplated.

In the embodiment shown, ASRC 42 may convert the sampling rate of the digital data stream, as received from digital demodulator 42, to that of blend unit 17. Delay estimator 44 may receive the analog data stream from analog demodulator 15, and the digital data stream at the converted sampling rate from ASRC 42. Delay estimator may determine which of the data streams is initially leading the other, as well as the amount of delay, and may set the selection and leading signals accordingly.

The leading data stream may be output by selection circuit 43A to FIFO 46. Delay estimation unit 44 may cause the delay of the leading signal to be adjusted in this embodiment by manipulating the circular distance between read and write pointers of FIFO 46. As seen in the diagram, the read and write pointers of FIFO 46 are separated by a circular distance D. Increasing the value of D may cause an increase in the amount of time data remains in FIFO 46, thereby increasing the delay applied to the leading data stream. Accordingly, the delay adjustment signal(s) generated by delay estimation unit 44 may change the read and write pointer separation for FIFO 46, and thereby change the delay applied to the leading data stream.

The output of FIFO 46 may be provided to blend unit 17 at its output sampling rate, as may the output of selection circuit 43B. Responsive to assertion of the blend signal by delay estimation unit 44, the blend operation may commence.

Figure 8:
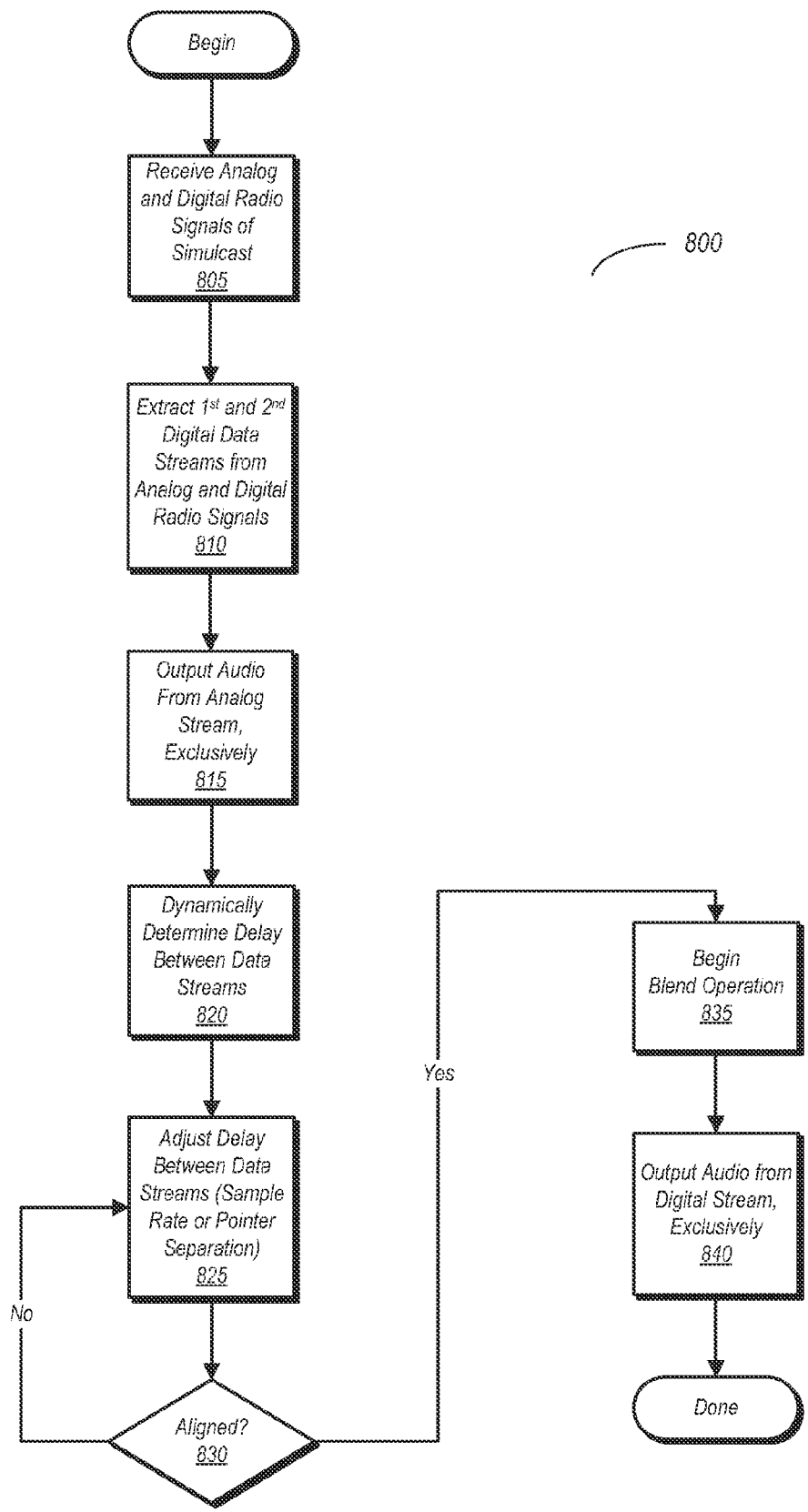
FIG. 8 is a flow diagram illustrating one embodiment of a method for dynamically aligning analog and digital programming received in a simulcast.

FIG. 8 is a flow diagram illustrating one embodiment of a method for dynamically aligning program content received from analog and digital radio signals in a simulcast. The methodology described herein may be implemented with the various embodiments of a radio receiver and delay unit as discussed above, and may be utilized with various other hardware and/or software embodiments not explicitly discussed herein.

Method 800 in the embodiment shown begins with the receiving of analog and digital radio signals of a simulcast (block 805). The simulcast signal may be similar to that illustrated in FIG. 3. Subsequent to receiving the simulcast signal, corresponding digital and analog data streams may be extracted from the digital and analog radio signals, respectively (block 810). Initial audio output may be provided from the analog data stream, exclusively (block 815).

Based on the information contained in the digital and analog data streams, a reception delay existing therebetween may be determined (block 820). Based on the amount of the reception delay, as well as a determination of which data stream is leading the other, the delay may be adjusted (block 825). The adjustment of the delay may be performed by adjusting the respective output sampling rates of one or more sampling rate converters in some embodiments, such as those described in conjunction with FIGS. 4 and 6. For embodiments similar to FIG. 7, delay adjustment may be performed by changing a circular separation between read and write pointers of a FIFO. Embodiments in which the delay of a data stream is adjusted by methods not explicitly described herein are also possible and contemplated.

If the two data streams are not sufficiently aligned in time (block 830), then the delay adjustment process of block 825 may continue. Once the two data streams are sufficiently aligned in time (i.e., there is a relative delay within a specified tolerance), a blend operation may begin (block 835). The blend operation may gradually increase the contribution of the digital data stream to the output audio while correspondingly reducing the contribution of the analog data stream. Upon completing the blend operation, audio may be output from the digital stream exclusively (block 840).

Figure 9:
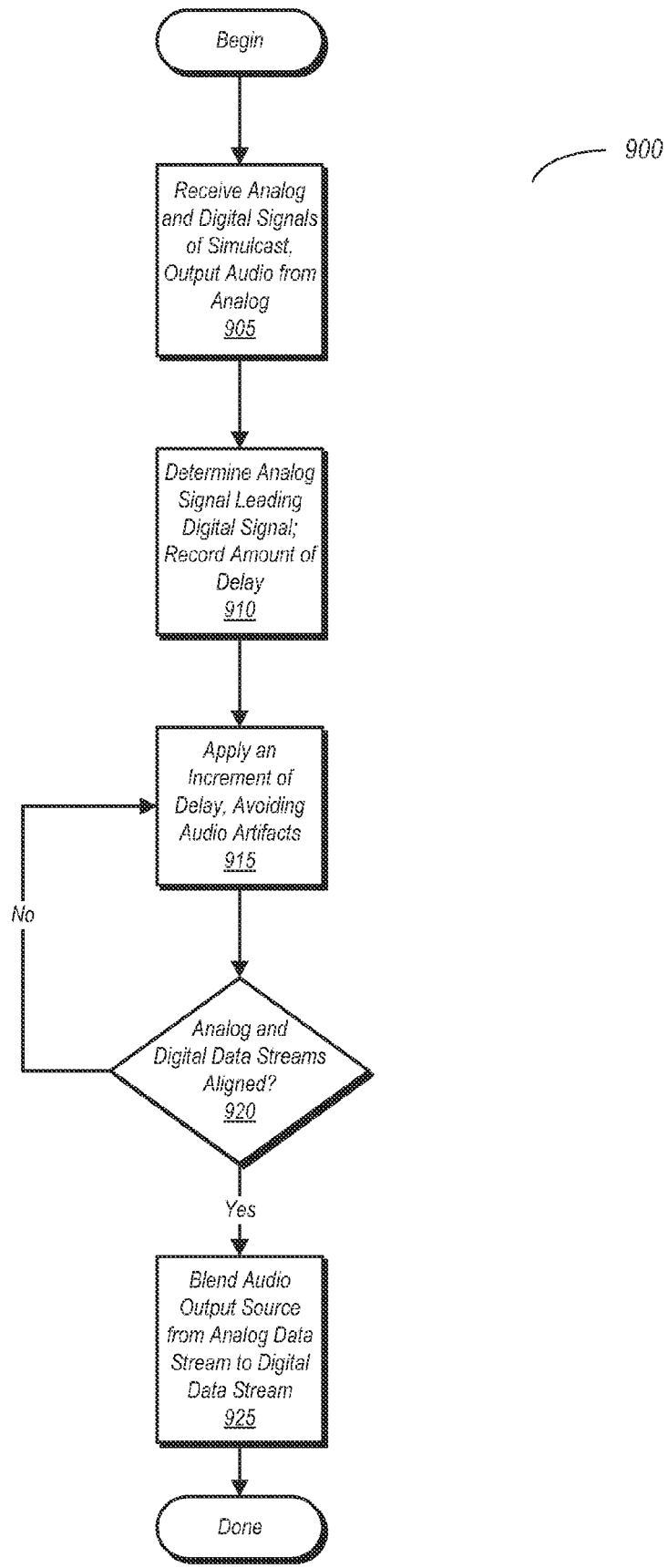
FIG. 9 is a flow diagram illustrating one embodiment of a method for aligning analog and digital programming when the analog signal initially leads the digital signal.

As noted above, upon initial reception of a simulcast signal, the audio may be sourced from the analog data stream. Thus, the case where the analog data stream leads the digital data stream may present a situation where the data stream providing the audio is also the data stream to which delay must be applied. If delay is applied suddenly or in large amounts, audio artifacts may be audible to a listener. Accordingly, FIG. 9 is a flow diagram directed to a method for delaying the analog data stream when it is initially leading without generating audio artifacts.

Method 900 begins with the reception digital and analog radio portions of a simulcast radio signal, and the initial outputting of audio based on the analog portion (block 905). The method further includes making a determination that the analog portion of the simulcast signal is leading the digital portion, and recording the amount of delay (block 910). The determination of which signal is leading and by how much may be made based on analysis of corresponding analog and digital data streams in a delay estimation unit, as described above with reference to FIG. 5. The initial amount of delay may be recorded and used for future reference if it is necessary to re-tune the receiver to the source of the simulcast radio signal.

The delay adjustment process may begin with applying an incremental amount of delay to the corresponding analog data stream (block 915). The amount of delay for a given increment may be small enough that audio artifacts detectable by a listener are avoided. For example, in one embodiment an increment of delay may be 20 milliseconds (ms) or less per second of audio, which may be undetectable to a listener. In general, the rate at which delay may be applied may be any rate that can be applied without producing audio artifacts detectable by a listener. Delay may be incrementally applied by any of the methods discussed above, as well as those not explicitly discussed herein. It is further noted that in some embodiments, delay may be applied in a continuous rather than incremental fashion.

If the analog and digital data remain misaligned (block 920, no), then another increment of delay is provided. This process may repeat itself a number of times, with the analog data stream being incrementally and gradually delayed using a rate that brings it into alignment with the digital data stream but avoids audio artifacts detectable by a listener.

Once the analog and digital data streams are sufficiently aligned (block 920, yes), a blend operation may begin (block 925). The blend operation may be conducted as previously described, reducing the contribution of the analog data stream to the output audio while correspondingly increasing the contribution of the digital data stream until the latter is the exclusive source.

Figure 10:
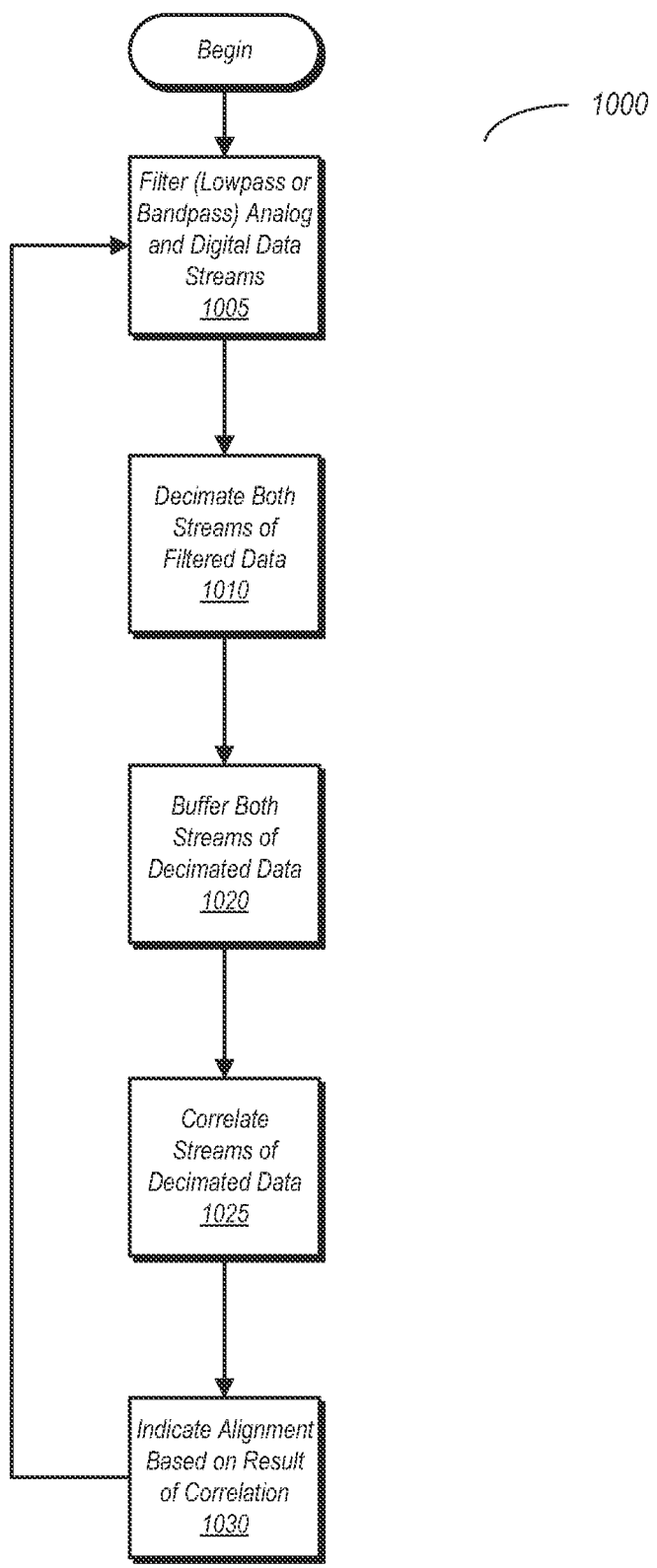
FIG. 10 is a flow diagram of one embodiment of a method for dynamically determining relative delay between two data streams extracted from a radio simulcast.

FIG. 10 is a flow diagram of one embodiment of a method for dynamically determining relative delay between two data streams extracted from a radio simulcast. Method 1000 may be implemented by the delay estimation unit 44 as shown in FIG. 5 and described herein. Other hardware embodiments, as well as software embodiments and combinations thereof may also be used to implement method 1000.

In the embodiment shown, method 1000 begins with the filtering of the analog and digital data streams to produce filtered data streams (block 1005). The filtering may allow data corresponding to a lower portion of the audio spectrum to pass, while rejecting data corresponding to higher frequencies. In one embodiment the filtering may be implemented using low pass filters, although bandpass filtering of a low portion of the audio spectrum is also possible and contemplated.

Subsequent to filtering, each of the filtered data streams may be decimated (block 1010). Decimation of the filtered data streams may be performed by reducing the number of samples, keeping only selected ones. In various embodiments, one of every N samples may be kept, while the decimation process may discard the remaining N−1 samples. Performing decimation on both streams of filtered data may result in corresponding streams of decimated data. The streams of decimated data may then be stored in respective buffers (block 1020). A correlator may receive the decimated data streams from each of the buffers, and may perform a correlation operation (block 1025). The correlation operation may determine which of the data streams is leading the other, as well as the amount of delay between them. Based on the results of the correlation, the alignment of the digital and analog data streams may be indicated (block 1030). Since the method is a dynamic method, it may return to block 1005 for incoming data, and may be continuously performed by the hardware and/or software in which it is implemented.

While the present disclosure includes reference to particular embodiments, it will be understood that the embodiments are illustrative and that the scope of the disclosure is not so limited. Any variations, modifications, additions, and improvements to the embodiments described are possible. These variations, modifications, additions, and improvements may fall within the scope of the inventions as detailed within the following claims.

What is claimed is:

1. An apparatus, comprising:
a first sample rate converter coupled to receive a first data stream corresponding to content extracted from a first radio signal, wherein the first sample rate converter is configured to output the first data stream at a first current sampling rate; and
a first selection circuit coupled to provide the first data stream to the first sample rate converter;
wherein the apparatus is configured to adjust timing of the first data stream relative to a second data stream having identical content to the first data stream by changing the first current sampling rate of the first sample rate converter;
wherein the first selection unit is coupled to receive first program data extracted from an analog radio signal and second program data extracted from a digital radio signal, wherein the first selection circuit is configured to select one of the first program data and the second program data to provide as the first data stream.

2. The apparatus as recited in claim 1, wherein the second data stream corresponds to content extracted from a second radio signal simulcast with the first radio signal.

3. The apparatus as recited in claim 1, further comprising a second selection unit coupled to receive the first program data and the second program data, wherein the second selection unit is configured to select and provide, as the second data stream, the one of the first and second program data not selected by the first selection unit.

4. The apparatus as recited in claim 3, further comprising a second sample rate converter coupled to receive the second data stream, wherein the second sample rate converter is configured to operate at a constant sampling rate.

5. The apparatus as recited in claim 1, further comprising a second sample rate converter coupled to receive the second data stream, wherein the second sample rate converter is configured to operate at a second current sampling rate, and wherein the apparatus is configured to adjust timing of the first data stream relative to the second data stream by changing the second current sampling rate of the second sample rate converter.

6. The apparatus as recited in claim 1, further comprising:
a first interface unit configured to receive the first radio signal from an analog transmitter; and
a second interface unit configured to receive the second radio signal from a digital transmitter.

7. A method, comprising:
a radio receiver receiving a first data stream corresponding to content extracted from a first radio signal, wherein the radio receiver includes a first sample rate converter that outputs the first data stream at a first sampling rate;
the radio receiver adjusting the timing of the first data stream relative to a second data stream having identical content to the first data stream, wherein the adjusting comprises changing the first sampling rate of the first sample rate converter;
receiving first program data extracted from an analog radio signal and second program data extracted from a digital radio signal simulcast with the analog radio signal; and
selecting one of the first program data and the second program data to provide as the first data stream.

8. The method as recited in claim 7, wherein the second data stream corresponds to content extracted from a second radio signal simulcast with the first radio signal.

9. The method as recited in claim 7, further comprising:
the radio receiver selecting the other one of the first program data and the second program data to provide as the second data stream; and
the radio receiver providing the second data stream using a second sample rate converter having a constant sampling rate.

10. The method as recited in claim 7, wherein the radio receiver includes a second sample rate converter that receives the second data stream, wherein the method further comprises:
the radio receiver changing a sampling rate of the second sample rate converter to adjust the timing of the first data stream relative to the second data stream.

11. A radio receiver, comprising:
a first sample rate converter coupled to receive a first data stream corresponding to program content extracted from a first radio signal, wherein the first sample rate converter is configured to output the first data stream at a first sampling rate; and
a delay estimation unit configured to determine a delay of the first data stream relative to a second data stream, wherein the delay estimation unit is configured to provide an indication of the delay to the first sample rate converter;
wherein the first sample rate converter is configured to adjust the delay based on the indication by changing the first sampling rate;
wherein the first sample rate converter is coupled to receive the first data stream from a first selection unit, and wherein the radio receiver further includes a second selection unit coupled to provide the second data stream; and
wherein the first selection unit and the second selection unit are each configured to receive a first digital representation of program content extracted from an analog radio signal, and a second digital representation of the program content extracted from a digital radio signal.

12. The radio receiver as recited in claim 11, further comprising a second sample rate converter coupled to receive the second data stream and configured to output the second data stream at a second sampling rate, wherein the second sample rate converter is coupled to receive the indication of the delay, and wherein the second data stream corresponds to program content extracted from a second radio signal.

13. The radio receiver as recited in claim 12, wherein the second sample rate converter is configured to change the second sampling rate based on the indication.

14. The radio receiver as recited in claim 11, wherein the first selection unit is configured to select one of the first digital representation and the second digital representation to provide as the first data stream, and wherein the second selection unit is configured to select the other one of the first digital representation and the second digital representation to provide as the second data stream.

15. The radio receiver as recited in claim 11, wherein the radio receiver further includes a second sample rate converter coupled to receive the second data stream, wherein operation of the second sample rate converter is not based on the indication provided by the delay estimation unit.

16. The radio receiver as recited in claim 11, further comprising:
a first interface unit configured to receive the first radio signal from an analog transmitter; and
a second interface unit configured to receive the second radio signal from a digital transmitter.

* * * * *